June 7, 1932.  H. A. WINNE  1,862,354
MOTOR CONTROL SYSTEM
Filed Oct. 28, 1930

Inventor:
Harry A. Winne,
by Charles E. Mueller
His Attorney.

Patented June 7, 1932

1,862,354

UNITED STATES PATENT OFFICE

HARRY A. WINNE, OF SCHENECTADY, NEW YORK, ASSIGNOR TO GENERAL ELECTRIC COMPANY, A CORPORATION OF NEW YORK

MOTOR CONTROL SYSTEM

Application filed October 28, 1930. Serial No. 491,806.

My invention relates to control systems for motors, more particularly to control systems for electric motors, and has for its object a simple and reliable control system for supplying a relatively large amount of power over a relatively short portion of a work cycle.

My invention has particular application to the control of motor driven devices requiring large amounts of power for relatively short and more or less infrequent work intervals, such as shears for steel slabs or billets. In the driving of shears a driving motor operating continuously to drive a flywheel is sometimes provided together with a clutch for connecting the motor to the shear when a cut is to be made. This system has a disadvantage of severe shocks on the driving equipment and shear and excessive wear in the clutch resulting from the connection of the stationary machine to the rotating driving motor. It is an object of my invention to provide driving means in which these disadvantages are overcome.

In carrying out my invention in one form I provide an auxiliary motor which is connected to drive the shear during the idle part of the work cycle and bring it up to approximately the speed of the main driving motor prior to the beginning of the cut or other work operation together with means driven by the auxiliary motor for connecting a main driving motor provided with a flywheel to the shear during the working operation.

Figure 1:
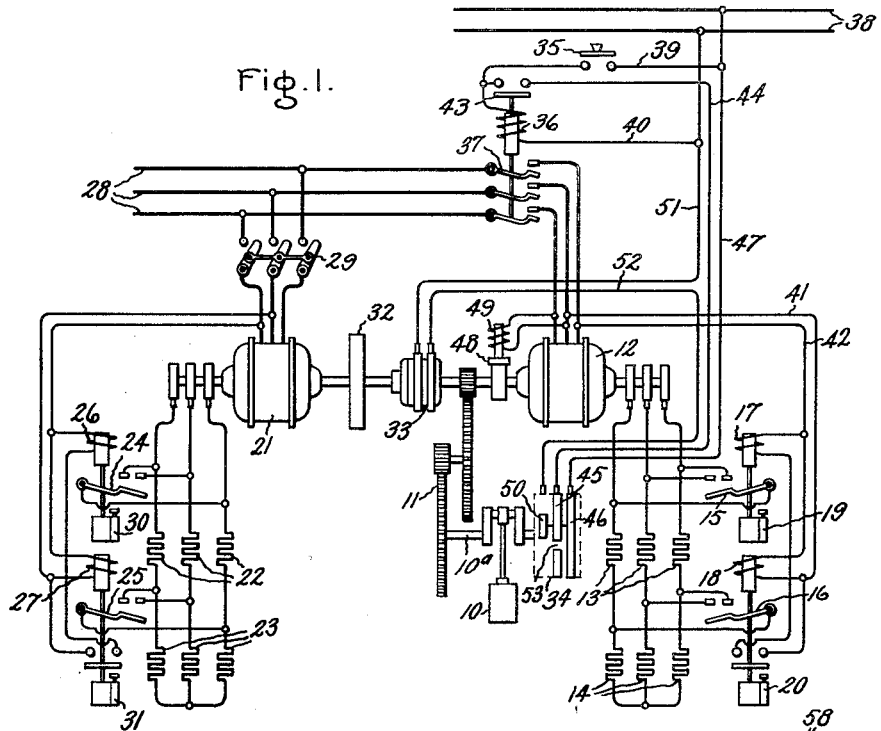
Figure 2:
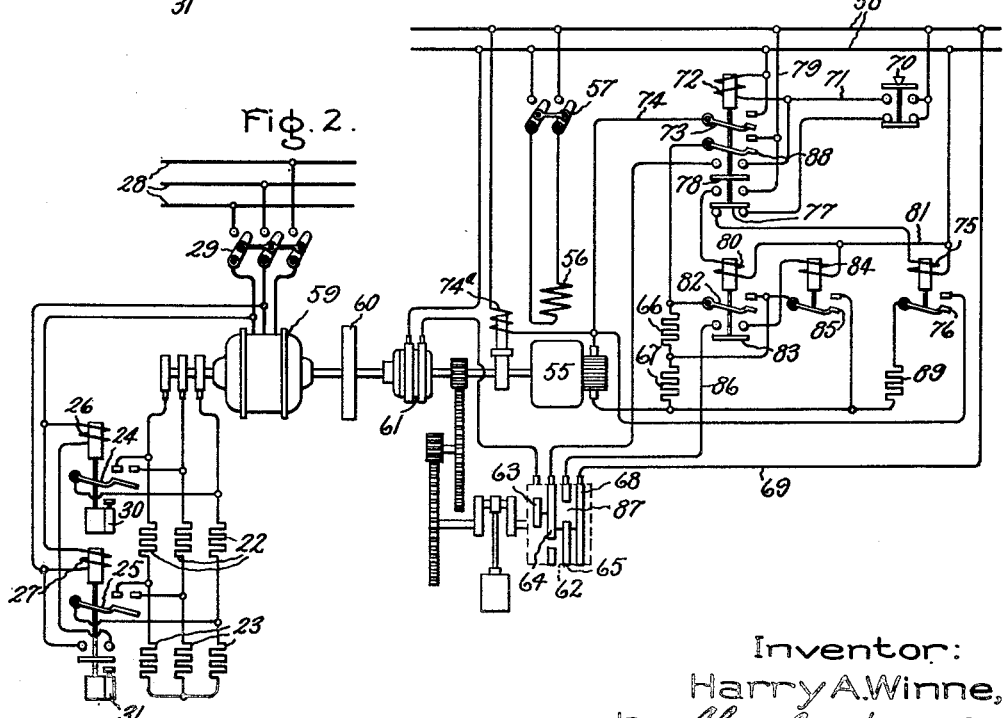

For a more complete understanding of my invention reference may be had to the accompanying drawing in which Fig. 1 is a diagrammatic representation of a control system, for a motor driven shear embodying my invention, while Fig. 2 is a diagrammatic representation of a modified form of my invention.

Referring to Fig. 1 of the drawing, I have shown my invention as applied to the control of a shear 10, as shown diagrammatically, a shear for cutting of metal, although it will be understood that my invention has general application to devices of a similar character in which a heavy power consuming operation is carried out in only a short portion of an operating cycle. The shear 10, comprising a reciprocating cutter driven from a crank shaft $10^a$, is connected through the gearing 11 to an auxiliary or secondary electric driving motor 12, shown as a three-phase slip-ring induction motor, which motor is primarily used to start the shear and bring it up to speed ready for the shearing operation, although it of course supplies power during the shearing operation as well. The motor 12 is provided with groups of starting resistances 13 and 14, in the slipring or rotor circuit, these resistances being arranged to be short circuited by the closing of switches 15 and 16, respectively, operated by coils 17 and 18. Suitable time element means is provided in connection with the switches 15 and 16, shown as dashpots 19 and 20, so as to cause the switches when the operating coils are energized, to close in a predetermined sequence and after predetermined time intervals in a manner well known in the art. The switch 16 is closed first after a predetermined time following the closing of the motor primary circuit, and after a still further time interval the switch 15 is closed thus short circuiting the sliprings of the motor and bringing the motor up to full speed. It will be observed that each revolution of the crank $10a$ constitutes a work cycle, the shearing operation or work interval forming only a small portion of this cycle.

A second motor 21, also of the three phase slipring induction type, is provided as the main driving means for the shear 10. This motor is preferably substantially larger in power output than the motor 12. It is also provided with groups or banks of starting resistors 22 and 23 together with switches 24 and 25, respectively, for short circuiting the resistors. These switches are operated respectively by coils 26 and 27, which are connected across the motor circuit so as to be energized when the motor is connected to the supply means 28 by the closing of the hand-operated switch 29. The closure of the switches 24 and 25 is delayed by suitable time element means, as shown by dash pots 30 and 31, in the manner described in connection with switches 15 and 16 so that the group of resistors 23 is first short circuited by the switch 25, after which the group 22 is short circuited by the switch 24 to bring the motor up to full speed.

The motor 21 is connected to drive a heavy flywheel 32. Its driving shaft can further be connected directly to the shaft of the motor 12, and hence to the shear, by means of a suitable clutch 33, shown as an electromagnetic clutch. With the direct connection between the shafts of the two motors shown, it is contemplated that the motor 21 will have a normal running speed which is substantially the same or somewhat higher than the normal running speed of the motor 12. This motor 21 runs continuously while the shear is in more or less intermittent use. Control means is provided for automatically energizing the clutch 33 so as to connect the motor 21 to the shear 10 just prior to the beginning of the shearing operation, constituting the work interval. A portion of the stored energy in the flywheel is given up in making the cut due to the slowing down of the motors and the flywheel. After the completion of the cut the motor 21 is automatically disconnected from the shear by the deenergization of the clutch 33 and accelerates the flywheel to store energy in it ready for the next cut.

This control means for the clutch 33 comprises a drum controller 34, having fixed brushes cooperating therewith, shown as developed in the plane of the drawing, this controller being driven by the shear in a clockwise direction looking from the right hand to the left hand as viewed in the drawing. The auxiliary motor 12 is operated during the cutting operation after which it is stopped automatically by the drum switch 34. It is started manually when a cut is to be made by pressing a switch button 35 which connects the operating coil 36 for the switch 37 across the D. C. control supply source 38, the connection being made through the conductors 39 and 40. Energization of the coil 36 closes the switch 37 connecting the motor 12 to the three-phase supply-source 28 and at the same time energizing the operating coils 17 and 18 which are connected by the conductors 41 and 42 across one phase of the motor circuit in parallel with each other. A relay switch 43 is provided on the switch 37, which relay switch is closed when the switch 37 is closed, and establishes a holding circuit for the coil 36 leading from one side of the supply source 38 through the conductor 40, the coil 36, to the switch 43, a conductor 44, to the conducting segment 45 on the drum controller, thence to the conducting segment 46, which is electrically connected to the segment 45, and through the conductor 47 to the opposite side of the supply source 38. By reason of this holding circuit the button 35 may be immediately released after the closing of the switch 37.

At the moment the motor 12 is connected to the line, the drum controller 34 will be in some such position as indicated in the drawing in relation to the brushes bearing on its segments; or, in other words, it is contemplated that the motor will come to rest after each cut with the drum controller in some such position as indicated with relation to its brushes. The motor 12 quickly comes up to speed, the switches 15 and 16 closing the previously described time sequence to short circuit the resistors 13 and 14. A brake 48 is provided for stopping the motor quickly when it is deenergized. This brake is released by a coil 49 connected across one phase of the motor circuit so that when the motor is energized the coil is also energized and the brake released.

The motor 12 operates to move the shear around to the cutting position and when the shear reaches this position, or just before, the conducting segment 50 on the drum controller reaches and engages its brush thereby energizing the clutch 33. This circuit for the clutch may be traced from the lower conductor of the supply source 38 through the conductor 51, the clutch 33, conductor 52, segment 50, to segment 46 which is electrically connected to the segment 50, and thence through the conductor 47 to the opposite side of the supply source 38. This connects the main driving motor 21 with the flywheel 32 to the shear during the cutting operation. Immediately after the cut has been completed, the conducting segment 50 moves past and disengages its brush, thus opening the circuit through the clutch and disconnecting the motor 21. The motor 21 then accelerates the flywheel to full speed ready for the next cut.

Shortly after the clutch was deenergized or at about the same time, the gap or insulating section 53 in the conducting segment 45 arrives under its brush thus opening the circuit for the coil 36 whereby the switch 37 drops to the open position disconnecting the motor 12 from the supply source and deenergizing the brake coil 49, whereby the brake is applied in accordance with its bias to stop the shear and the motor 12. Since the holding circuit for the coil 36 is opened by the relay switch 43 when the main switch 37 opens; the motor 12 is not reconnected to the supply source 28 when the segment 45 moves under its brush, due to the continued relatively small movement of the motor in coming to rest. It is essential, of course, that the insulating section 53 should move past its brush so the brush rests on the conducting segment 45 before the motor comes to rest. This permits the holding circuit for the coil 36 to be immediately established by the switch 43 when the button 35 is pressed to start the motor.

In a modified form of my invention shown in Fig. 2, the auxiliary driving motor 55, which is geared directly to the shear, is a direct current, separately excited motor having a main field winding 56 which may be connected by a switch 57 to a direct current supply source 58. This motor is provided with automatic speed control means whereby its speed is increased to move the shear around more quickly to a position ready for the next cut than is possible with a single-speed motor, such as shown in Fig. 1. In this modification the main driving motor 59 operates to drive the flywheel 60 in the manner described in Fig. 1 in connection with the motor 21. It is automatically connected by a clutch 61 to the shear by means of a drum controller 62 driven by the shear. This drum controller is provided with a relatively short segment 63 which controls the energization of the clutch 61 in the manner described in connection with Fig. 1 and with a segment 64 to control the stopping of the motor 55. An additional conducting segment 65 is provided to control the resistances 66 and 67 and to thereby operate the motor at a high speed in bringing the shear around for a cut. The drum controller is also provided with a continuous conducting segment 68 which is connected directly to one side of supply source 58 through the conductor 69. The four segments 63, 64, 65 and 68 are electrically connected with each other.

In the operation of this system the auxiliary motor 55 is started by pressing the button 70 whereby a circuit is closed from one side of the supply source 58 through the upper contacts of the button, the conductor 71, and the operating coil 72 to the opposite side of the supply source 58. The energization of the coil 72 closes a switch 73 whereby the armature of the motor 55 is connected across the supply source 58 in series with the resistances 66 and 67. This circuit may be traced from the lower main of the supply source 58 through the upper contact of the switch 73, the conductor 74, the armature of the motor, and through the resistances 67 and 66 in the order mentioned and the lower contact of the switch 73 to the upper main of the supply source 58. The brake coil 74ª is also energized to release the brake when the switch 73 closes. It is understood, of course, that the switch 57 was closed to energize the shunt field 56 prior to the pressing of the button 70.

The pressing of the button 70 also opened a circuit established by the lowermost contacts of the button, which are insulated from the upper contacts, for the operating coil 75 of the switch 76, which when closed establishes a dynamic braking circuit for the motor. To give further assurance that this circuit will be opened, a relay switch 77 is provided on the main switch 73 which is opened when the main switch closes. The front contacts of switch 77 are closed when the main switch 73 closes and a circuit is thereby established from the upper main of the supply source 58 through the conductor 79, the switch 77, a coil 80, and the conductor 81 to the opposite side of supply source 58. The energization of the coil 80 closes the switch 82 which short-circuits the resistor 66 to still further accelerate the motor. The closing of switch 82 also closes the relay switch 83 which in turn closes the circuit for the coil 84 and this coil closes a switch 85 to short circuit the resistor 67 and thus bring the motor 55 up to full speed. This circuit for the coil 84 may be traced from the upper main of the source 58, through the conductor 69 the conducting segment 68, to the segment 62, 65, thence through the conductor 86, the relay switch 83, the coil 84 and conductor 81 back to the lower main of the source 58. This high speed operation of the motor 55 brings the shear quickly around to the shearing position. When the shear reaches this position, or just before, the insulating section 87 in the conducting segment 65 comes under its brush, thus breaking the circuit for the coil 84 whereby the switch 85 opens in accordance with its bias and reinserts the resistance 67. This tends to slow down the motor 55 to approximately the same speed as the motor 59.

At about the same time or shortly after the coil 84 was deenergized the segment 63 of the drum controller reaches its brush and closes the circuit for the clutch 61 whereby the motor 59 is connected to the shear. This circuit is the same as the clutch circuit previously traced in Fig. 1. After the cut has been completed, the segment 63 runs out from under its brush, thereby opening the clutch circuit and disconnecting the motor 59. At about the same time or soon thereafter, the segment 65 runs under its brush, energizing the coil 84 and closing the switch 85 which short circuits the resistance 67. This speeds up the motor 55 so as to move the shear around more quickly ready for the next cut. After a short interval the insulating section of the segment 64 runs under its brush and opens the holding circuit for the coil 72 whereby the switch 73 drops open to disconnect the armature of the motor 55 and apply the brake. At the same time the switch 78 in the holding circuit for the coil 72 opens so that the motor can only be started by pressing the button 70. Also the relay switch 77 opens its upper contacts, thereby deenergizing the coil 80 and allowing the switch 82 to open and insert the resistances 66 in the armature circuit. The opening of the switch 82 also opens the relay switch 83 which deenergizes the coil 84 and allows the switch 85 to reinsert the resistance 67. The opening of the switch 73 also closes the lower contacts of relay switch 77 which establishes a circuit for the coil 75 whereby the switch 76 is closed and the armature of the motor connected in a dynamic brake circuit in series with the resistance 89. The motor is then brought to rest quickly.

What I claim as new and desire to secure by Letters Patent of the United States, is:

1. The combination in a motor control system of a main driving motor, a secondary driving motor, an inertia device driven by said main driving motor, means for connecting said motors together and means driven by said secondary driving motor for controlling the operation of said connecting means.

2. The combination in a motor control system of a main driving motor, a secondary driving motor, an inertia device driven by said main driving motor, a clutch for connecting said motors together and means driven by said secondary driving motor for controlling the operation of said clutch to connect and disconnect said motors to carry out a predetermined work cycle.

3. The combination with a device requiring a large amount of power during a work interval forming a relatively short portion of an operating cycle, a motor connected to said device, a second motor, an inertia device driven by said second motor and means controlled by the operation of said device for connecting said second motor to said device during said work interval after which said second motor is released and operates to accelerate said inertia device.

4. The combination with a device requiring a large amount of power during a work interval forming a relatively short portion of an operating cycle, of an auxiliary driving motor connected thereto, a continuously operating main driving motor, a flywheel connected to said main driving motor, a normally open clutch for connecting said secondary motor to said device, a magnet winding for operating said clutch, means driven by said device for energizing said winding at the beginning of the operating cycle and for deenergizing said winding to disconnect said main driving motor at the end of the operating cycle.

5. A driving system for a device having a work interval forming a portion of an operating cycle, a motor for driving said device, manually operated means for starting said motor, a second continuously operating motor, a flywheel driven by said second motor, an electromagnetic clutch for connecting said second motor to said device and control means driven by said device for operating said clutch to connect said second motor to said device during said work interval and to disconnect said second motor and deenergize said first motor upon the completion of said work interval.

6. A driving system for a device having a work interval forming a predetermined relatively short portion of an operating cycle, an auxiliary driving motor connected to said device, manually operated means for starting said motor, a second continuously operating main driving motor, a flywheel driven by said second motor, an electromagnetic clutch for connecting said second motor to said device, control means driven by said device for operating said clutch to connect said second motor to said device during said work interval and to disconnect said second motor upon the completion of said work interval and control means driven by said device for operating said auxiliary driving motor at an increased speed to move said device into position for said work interval and for deenergizing said auxiliary driving motor after the completion of said work interval.

In witness whereof, I have hereunto set my hand this 27th day of October, 1930.

HARRY A. WINNE.